(12) United States Patent
Torii et al.

(10) Patent No.: US 10,180,183 B2
(45) Date of Patent: Jan. 15, 2019

(54) AUTOMATIC TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Takeshi Torii, Chiryu (JP); Akira Miyazaki, Kariya (JP); Masashi Ikemura, Toyota (JP); Shinji Oita, Toyota (JP); Masaru Morise, Nakata (JP)

(73) Assignees: AISIN AW CO., LTD., Anjo-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 688 days.

(21) Appl. No.: 14/436,378

(22) PCT Filed: Nov. 19, 2013

(86) PCT No.: PCT/JP2013/081206
§ 371 (c)(1),
(2) Date: Apr. 16, 2015

(87) PCT Pub. No.: WO2014/077408
PCT Pub. Date: May 22, 2014

(65) Prior Publication Data
US 2015/0323060 A1    Nov. 12, 2015

(30) Foreign Application Priority Data
Nov. 19, 2012   (JP) .................................. 2012-253752

(51) Int. Cl.
*F16H 57/08*     (2006.01)
*F16D 13/64*     (2006.01)
*F16H 3/66*      (2006.01)

(52) U.S. Cl.
CPC ........... *F16H 57/08* (2013.01); *F16D 13/644* (2013.01); *F16D 13/648* (2013.01); *F16H 3/663* (2013.01);
(Continued)

(58) Field of Classification Search
CPC .... F16H 2057/087; F16H 57/08; F16H 3/666; F16H 3/663; F16D 13/644; F16D 13/648; F16D 13/683
See application file for complete search history.

(56) References Cited

U.S. PATENT DOCUMENTS 6,176,802 B1 *  1/2001  Kasuya ................... F16H 3/663
                                                    475/269
7,559,867 B2 *  7/2009  Seki ...................... F16D 13/683
                                                    475/146
(Continued)

FOREIGN PATENT DOCUMENTS

JP        S55-57728 A      4/1980
JP        2000-136854 A    5/2000
(Continued)

OTHER PUBLICATIONS

International Search Report of PCT/JP2013/081206 dated Feb. 25, 2014 [PCT/ISA/210].

*Primary Examiner* — Erin D Bishop
(74) *Attorney, Agent, or Firm* — Sughrue Mion, PLLC

(57) ABSTRACT

In an automatic transmission including a deceleration planetary gear and a hydraulic clutch, the hydraulic clutch includes a clutch drum, a clutch hub, first and second friction engagement plates, a piston, and an engagement oil chamber defining member. The clutch hub is formed by a ring gear and a support member that rotates together with the ring gear. The piston is movably supported by the clutch hub. The piston and the support member define a cancel oil chamber that cancels a centrifugal oil pressure generated in an engagement oil chamber.

13 Claims, 6 Drawing Sheets

(52) U.S. Cl.
CPC ....... *F16H 3/666* (2013.01); *F16H 2057/087* (2013.01); *F16H 2200/006* (2013.01); *F16H 2200/0086* (2013.01); *F16H 2200/2007* (2013.01); *F16H 2200/2023* (2013.01); *F16H 2200/2046* (2013.01); *F16H 2200/2048* (2013.01); *F16H 2200/2066* (2013.01); *F16H 2200/2082* (2013.01); *F16H 2200/2097* (2013.01)

(56) References Cited

U.S. PATENT DOCUMENTS

| | | | |
|---|---|---|---|
| 2006/0264297 A1 | 11/2006 | Seki et al. | |
| 2008/0017469 A1* | 1/2008 | Iwasaki | F16D 13/648 |
| | | | 192/48.5 |
| 2011/0221292 A1 | 9/2011 | Kuwahara et al. | |

FOREIGN PATENT DOCUMENTS

| | | |
|---|---|---|
| JP | 2001-116060 A | 4/2001 |
| JP | 2006-349162 A | 12/2006 |
| JP | 2008-025642 A | 2/2008 |
| JP | 2008-121808 A | 5/2008 |
| JP | 2009-243626 A | 10/2009 |
| JP | 2010-151271 A | 7/2010 |
| JP | 2010-151313 A | 7/2010 |

\* cited by examiner

FIG. 2

|      | C-1 | C-2 | C-3 | C-4 | B-1 | B-2 | F-1 |
|------|-----|-----|-----|-----|-----|-----|-----|
| 1st  | ●   |     |     |     |     | (●) | ●   |
| 2nd  | ●   |     |     |     | ●   |     |     |
| 3rd  | ●   |     | ●   |     |     |     |     |
| 4th  | ●   |     |     | ●   |     |     |     |
| 5th  | ●   | ●   |     |     |     |     |     |
| 6th  |     | ●   |     | ●   |     |     |     |
| 7th  |     | ●   | ●   |     |     |     |     |
| 8th  |     | ●   |     |     | ●   |     |     |
| Rev1 |     |     | ●   |     |     | ●   |     |
| Rev2 |     |     |     | ●   |     | ●   |     |

(●) : ENGINE BRAKE IN OPERATION

AUTOMATIC TRANSMISSION

CROSS REFERENCE TO RELATED APPLICATIONS

This application is a National Stage of International Application No. PCT/JP2013/081206, filed Nov. 19, 2013, claiming priority based on Japanese Patent Application No. 2012-253752, filed Nov. 19, 2012, the contents of all of which are incorporated herein by reference in their entirety.

TECHNICAL FIELD

The subject matter described herein relates to automatic transmissions that are mounted on, e.g., vehicles etc., and more particularly to automatic transmissions having a structure in which inner friction plates and outer friction plates of a clutch are provided on the outer peripheral side of a ring gear of a planetary gear.

BACKGROUND ART

In recent years, automatic transmissions using a planetary gear having a ring gear in order to attain the speed ratios of an output member are widely used as automatic transmissions that are mounted on vehicles etc. In this type of automatic transmission, multiple speeds such as, e.g., eight forward speeds have been implemented in response to a demand for improved fuel economy etc., and automatic transmissions using a deceleration planetary gear and a shifting planetary gear are known in the art.

Such automatic transmissions are desired to be compact in view of mountability on vehicles. As a solution, there is an automatic transmission using a clutch including inner friction plates that are engaged with splines formed on the outer periphery of a ring gear of a deceleration planetary gear, outer friction plates that are placed alternately with the inner friction plates, and a hydraulic servo having a piston capable of pressing the inner friction plates from one side in the axial direction (see Patent Document 1). The outer friction plates are coupled to a sun gear of a shifting planetary gear. That is, this clutch couples and decouples the ring gear of the deceleration planetary gear to and from the sun gear of the shifting planetary gear. This automatic transmission can be made compact as the deceleration planetary gear can be placed so as to overlap the inner friction plates and the outer friction plates of the clutch in the axial direction.

In this automatic transmission, the hydraulic servo that presses the inner friction plates and the outer friction plates by the piston is contained in a clutch drum to which the outer friction plates are coupled, and the hydraulic servo is provided so as to rotate together with the sun gear of the shifting planetary gear.

In order to support the ring gear, this automatic transmission includes a substantially circular plate-shaped support member on which the ring gear is fitted. The ring gear and the support member are positioned in the axial direction by a snap ring. According to this configuration, the ring gear and the support member can be integrated by a simple configuration.

RELATED ART DOCUMENT

Patent Document

[Patent Document 1] Japanese Patent Application Publication No. 2008-121808 (JP 2008-121808 A)

SUMMARY OF THE INVENTION

The sun gear of the shifting planetary gear can rotate at a high speed depending on setting of the shift speed. The hydraulic servo provided so as to rotate together with the sun gear is therefore increased in size for increased rigidity in order to ensure resistance to a centrifugal force generated by the high speed rotation, and it is difficult to make a compact configuration. Accordingly, it is desired to suppress an increase in size of the automatic transmission for increased rigidity for this reason and to make a compact automatic transmission.

The rotational speed of the ring gear of the deceleration planetary gear is lower than that of the sun gear of the shifting planetary gear during the high speed rotation. Accordingly, providing the hydraulic servo for the ring gear of the deceleration planetary gear can reduce the centrifugal force that is applied to the hydraulic servo and thus can reduce required rigidity, and can make a compact configuration.

In the automatic transmission of Patent Document 1, however, the ring gear and the support member are positioned in the axial direction by the snap ring. Accordingly, in order to provide the hydraulic servo for the support member of the ring gear, it is desired to bond the ring gear and the support member by welding in order to ensure rigidity required to include the hydraulic servo. In the case where the hydraulic servo is provided for the support member of the ring gear, a stopper portion is required which positions the inner and outer friction plates that are pressed by the piston with respect to the ring gear in the axial direction.

In the case of bonding the ring gear and the support member by welding in the automatic transmission of Patent Document 1, however, the welded portion is subjected not only to radial stress associated with rotation but also to thrust stress due to a helical gear used in the planetary gear. Moreover, a closed loop of stress is formed by the ring gear, the stopper portion, the inner and outer friction plates, the hydraulic servo, the support member, and the ring gear in this order by operation of the piston, which causes concentration of the thrust stress. It is desired to suppress concentration of stress in order to obtain required durability.

It is a first object to provide an automatic transmission capable of suppressing an increase in size for increased rigidity against a centrifugal force that is caused by high speed rotation, and capable of achieving a compact configuration. It is a second object to provide an automatic transmission capable of improving durability by suppressing concentration of stress on a weld surface between a ring gear and a support member.

Means for Solving the Problem

An automatic transmission according to the one embodiment is an automatic transmission including a double-pinion type deceleration planetary gear that decelerates rotation that is input to a carrier and outputs the decelerated rotation from a ring gear, and a hydraulic clutch that couples and decouples the ring gear of the deceleration planetary gear to and from another rotary element, wherein the hydraulic clutch includes a clutch drum that is coupled to the another rotary element, a clutch hub having the ring gear of the deceleration planetary gear integrated therewith, a first friction engagement plate that is fitted in the clutch drum, a second friction engagement plate that is fitted to the clutch hub, a piston that presses the first and second friction engagement plates to cause the first and second friction engagement plates to frictionally engage with each other, and an engagement oil chamber defining member that together with the piston defines an engagement oil chamber to which an engagement oil pressure is supplied, the piston is movably supported by the clutch hub, and together with the clutch hub defines a cancel oil chamber that cancels a centrifugal oil pressure generated in the engagement oil chamber, the clutch hub is formed by the ring gear, and a support member that rotates together with the ring gear and that rotatably supports the ring gear on an input shaft of the automatic transmission, and the cancel oil chamber is defined by the piston and the support member.

The automatic transmission including the second friction engagement plate is fitted to an outer periphery of the ring gear, and is pressed from one side in an axial direction by the piston, the clutch hub includes a stopper portion that positions the other side in the axial direction of the second friction engagement plate with respect to the ring gear, and the engagement oil chamber defining member is axially immovably supported by the support member.

The automatic transmission (see, further includes: a second planetary gear including the another rotary element, wherein the clutch hub, the piston, and the engagement oil chamber defining member are placed inside the clutch drum between the deceleration planetary gear and the second planetary gear.

The automatic transmission according to an embodiment is configured such that an outer periphery of the engagement oil chamber defining member is sealed in an oil-tight manner from the piston, and an inner periphery of the engagement oil chamber defining member is sealed in an oil-tight manner from the clutch hub, and is located closer to the another rotary element than the outer periphery thereof is.

The automatic transmission according to an embodiment is configured such that the input shaft includes a first input shaft that rotatably supports the support member, and a second input shaft that rotatably supports the another rotary element, the first input shaft has at its end on the second input shaft side a fitting portion that fits to an outer peripheral surface of an end of the second input shaft, and a thrust bearing having an inner diameter smaller than an outer diameter of the first input shaft is provided between the clutch drum and the support member at a position located on the another rotary element side with respect to the fitting portion.

The automatic transmission according to the an embodiment is configured such that the support member is rotatably supported radially outward of the fitting portion via a radial bearing, and has a hydraulic oil passage formed on the first input shaft side with respect to the radial bearing so as to extend from an inner periphery of the support member and to communicate with the engagement oil chamber, and a pair of seal rings that seal on both sides in the axial direction the hydraulic oil passage in an oil-tight manner are provided between the support member and the first input shaft.

The automatic transmission according to the an embodiment is configured such that a maximum rotational speed of the another rotary element is the highest of a plurality of rotary elements forming the automatic transmission.

The automatic transmission according to an embodiment is configured such that the ring gear includes a gear portion that meshes with a pinion of the deceleration planetary gear, a gear-side weld portion that is welded at a weld surface to a support-side weld portion of the support member, and a thin portion that is formed between the gear portion and the gear-side weld portion and that has a smaller thickness than the gear portion and the gear-side weld portion.

The automatic transmission according to an embodiment is configured such that an inner peripheral surface of the gear-side weld portion is welded to an outer peripheral surface of the support-side weld portion, and an inner peripheral surface of the thin portion has a recess that is recessed with respect to the inner peripheral surface of the gear-side weld portion.

The automatic transmission according to an embodiment is configured such that the support member has a contact portion that contacts the gear portion, and the recess is closed by the gear portion and the support member.

The automatic transmission according to an embodiment is configured such that a corner of the recess is formed in a continuous curved shape.

The automatic transmission according to an embodiment is configured such that the inner peripheral surface of the gear-side weld portion is placed on an outer peripheral side with respect to a tooth bottom of the gear portion.

The automatic transmission according to an embodiment is configured such that an inner peripheral edge of a side surface on the thin portion side of the gear-side weld portion and an outer peripheral edge of a side surface on the thin portion side of the support-side weld portion have a surface extending in a radial direction.

Reference characters in parentheses are merely for reference to the drawings. Such reference characters are added for convenience to facilitate understanding, and are to have no effect on the configurations described in the claims.

According to the present embodiment, an automatic transmission includes a double-pinion type deceleration planetary gear that decelerates rotation that is input to a carrier and outputs the decelerated rotation from a ring gear, and a hydraulic clutch that includes a clutch hub having the ring gear of the deceleration planetary gear integrated therewith. A piston that presses first and second friction engagement plates of the hydraulic clutch to cause the first and second friction engagement plates to frictionally engage with each other is movably supported by the clutch hub. The piston together with the clutch hub defines a cancel oil chamber that cancels a centrifugal oil pressure generated in an engagement oil chamber to which an engagement oil pressure is supplied. An engagement oil chamber defining member that together with the piston defines the engagement oil chamber is supported by the clutch hub so as to be located on the opposite side of the piston from the cancel oil chamber. The piston and the engagement oil chamber defining member which define the engagement oil chamber and the cancel oil chamber can thus be made to rotate together with the ring gear that always rotates at a rotational speed lower than that of the carrier as an input element of the deceleration planetary gear. Accordingly, even if rotation that is input to the carrier is increased in speed, generation of an excessive centrifugal oil pressure in the engagement oil chamber and the cancel oil chamber can be satisfactorily suppressed. Therefore, in the automatic transmission, rigidity required for the clutch hub, the piston, and the engagement oil chamber defining member which define the engagement oil chamber and the cancel oil chamber of the hydraulic clutch can further be reduced. These members can thus be reduced in thickness, and the size of the hydraulic clutch and thus the automatic transmission can be reduced especially in the axial direction.

The clutch hub is formed by the ring gear and a support member that rotates together with the ring gear and that rotatably supports the ring gear on an input shaft of the automatic transmission, and the cancel oil chamber is defined by the piston and the support member. The piston and the engagement oil chamber defining member which define the engagement oil chamber and the cancel oil chamber can thus be made to rotate together with the ring gear rotatably supported on the input shaft of the automatic transmission. Accordingly, even if rotation of the input shaft is increased in speed, generation of an excessive centrifugal oil pressure in the engagement oil chamber and the cancel oil chamber can be more satisfactorily suppressed.

According to the present embodiment, the clutch hub includes a stopper portion that positions the other side in the axial direction of the second friction engagement plate with respect to the ring gear, and the engagement oil chamber defining member is axially immovably supported by the support member. A pressing force of the piston is therefore transmitted from each friction engagement plate to the ring gear via the stopper portion. A reaction force that is applied rearward to support the pressing of the piston is transmitted from the hydraulic oil in the engagement oil chamber to the support member via the engagement oil chamber defining member. A closed loop of axial stress is thus formed in the ring gear, the hydraulic clutch, and the support member. Axial stress is generated between the ring gear and the support member by the operation of the piston, and the closed loop operates.

According to the present embodiment, the clutch hub, the piston, and the engagement oil chamber defining member are placed inside a clutch drum between the deceleration planetary gear and a second planetary gear. Accordingly, the space inside the clutch drum between the deceleration planetary gear and the second planetary gear can be effectively used, and the axial length of the hydraulic clutch and thus the automatic transmission can further be reduced.

According to the present embodiment, an inner periphery of the engagement oil chamber defining member is located closer to another rotary element than an outer periphery thereof. The overall shape of the engagement oil chamber defining member is therefore a convex shape having its central portion protruding toward the another rotary element. This can improve rigidity of the engagement oil chamber defining member and reduce the axial thickness thereof as compared to the case where the engagement oil chamber defining member is in the shape of a flat plate.

According to the present embodiment, the size of a thrust bearing interposed between the clutch drum and the support member can be reduced in the inner radial direction. The radial size of the thrust bearing can thus be reduced, and the size of the automatic transmission can be reduced.

According to the present embodiment, since a hydraulic oil passage extending from an inner periphery of the support member and communicating with the engagement oil chamber is disposed on the first input shaft side with respect to a radial bearing, the engagement oil chamber can be placed toward the first input shaft side. Hydraulic oil can thus be supplied from an oil passage formed in an outer periphery of the first input shaft to the engagement oil chamber through only one oil passage, whereby the number of parts is reduced and the less time is needed to machine oil passages.

According to the present embodiment, a maximum rotational speed of the another rotary element is the highest of maximum rotational speeds of a plurality of rotary elements forming the automatic transmission. In this case, the clutch drum of the hydraulic clutch is coupled to the rotary element whose rotational speed can be the highest of the plurality of rotary elements forming the automatic transmission. Even if the clutch drum together with the another rotary element is rotating at a high rotational speed when the hydraulic clutch is disengaged, the piston and the engagement oil chamber defining member which define the engagement oil chamber and the cancel oil chamber rotate together with the ring gear of the deceleration planetary gear which is independent of the rotational speed of the clutch drum. Accordingly, generation of an excessive centrifugal oil pressure in the engagement oil chamber and the cancel oil chamber can be more satisfactorily suppressed.

According to the present embodiment, the ring gear has a thin portion between a gear portion and a gear-side weld portion. Accordingly, when the ring gear is subjected to large radial stress, the thin portion is elastically deformed to a larger extent than the gear portion and the gear-side weld portion, whereby the stress to be transmitted to a weld surface is absorbed and reduced. This can suppress concentration of stress of the ring gear and the support member on the weld surface and thus can improve durability.

According to the present embodiment, the thin portion has a recess in its inner peripheral surface. Accordingly, the outer diameter of the thin portion can be made to be the same as that of the gear portion and the gear-side weld portion, and splines can be formed on the entire outer peripheral surfaces of the gear portion, the thin portion, and the gear-side weld portion of the ring gear. This can improve machinability for forming the splines.

According to the present embodiment, since the recess of the thin portion is closed by the support member, the recess is a closed space, and spatter (metal particles spattered from the welded portions) that is generated when welding the gear-side weld portion and the support-side weld portion can be confined in the closed space. This can suppress spatter scattering to other parts and contaminating lubricating oil, or can suppress spatter adhering to tooth surfaces of the ring gear etc.

According to the present embodiment, a corner of the recess is formed in a continuous curved shape. This can disperse stress and can suppress concentration of stress as compared to the case where the corner is formed by, e.g., crossing of straight lines, such as a right angle.

According to the present embodiment, an inner peripheral surface of the gear-side weld portion is located on the outer peripheral side with respect to a tooth bottom of the gear portion. This can prevent interference of a broach with the gear-side weld portion when forming teeth in the gear portion with, e.g., a broaching machine, and can improve machinability for forming the ring gear.

According to the present embodiment, an inner peripheral edge of a side surface on the thin portion side of the gear-side weld portion and an outer peripheral edge of a side surface on the thin portion side of the support-side weld portion have a surface extending in the radial direction. This can suppress concentration of stress on the weld surface as compared to the case where the inner peripheral edge and the outer peripheral edge form an angle, especially an acute angle.

BRIEF DESCRIPTION OF THE DRAWINGS

FIG. 2 is an engagement table of shift speeds of the automatic transmission.

DETAILED DESCRIPTION OF THE PREFERRED EMBODIMENTS

Figure 1:
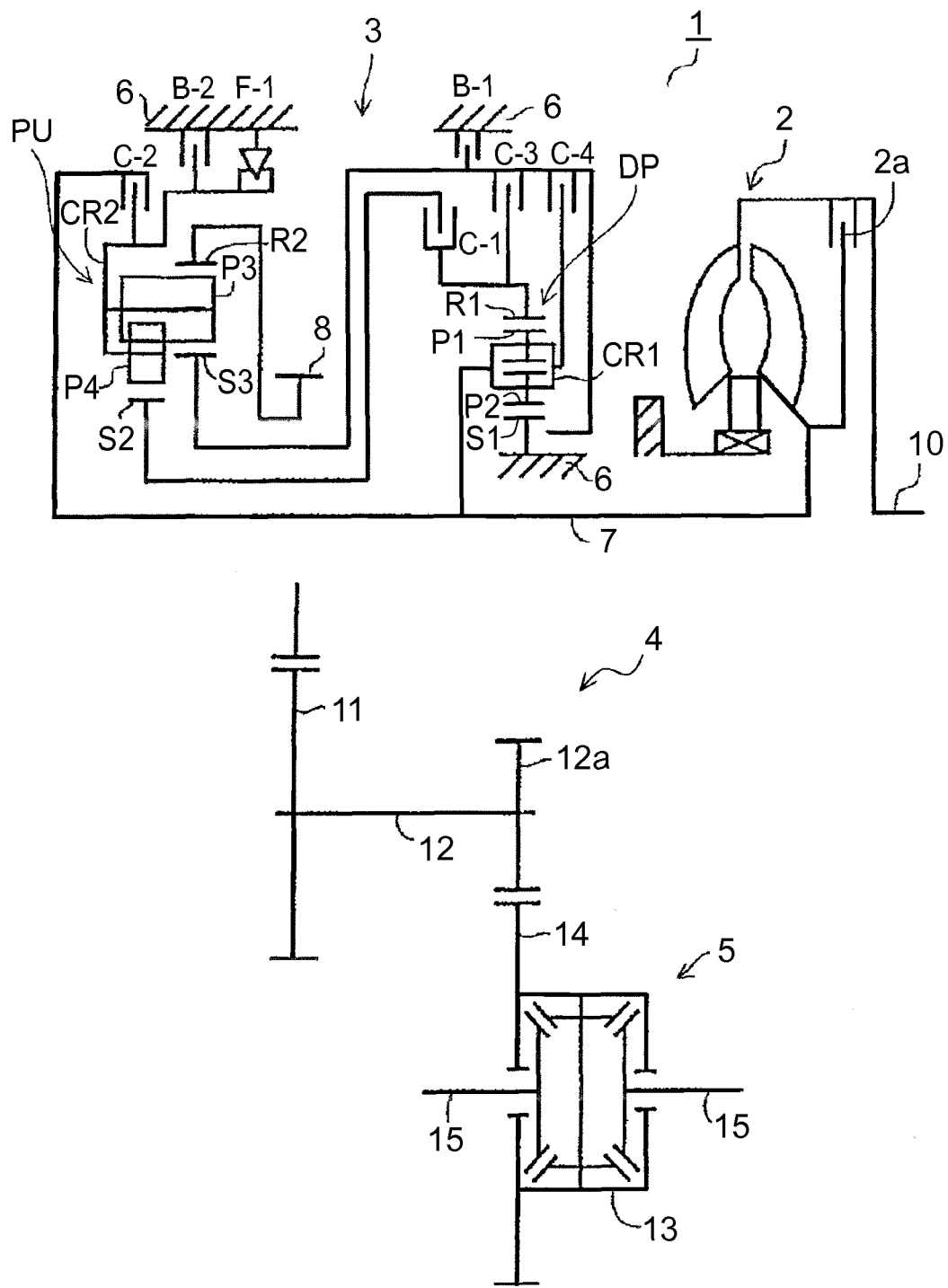
FIG. 1 is a skeleton diagram showing an automatic transmission according to an embodiment.

An embodiment will be described below with reference to FIGS. 1 to 5.

An automatic transmission according to the present embodiment is an automatic transmission that is preferably mounted on a vehicle such as, e.g., a front engine, front drive (FF) vehicle. The lateral direction in FIGS. 1, 4 and 5 corresponds to the lateral direction (or the opposite lateral direction) in the state where the automatic transmission is actually mounted on the vehicle. For convenience of description, the right side in the figures as the driving source side such as an engine is referred to as the "front side," and the left side in the figures is referred to as the "rear side." Although the automatic transmission of the present embodiment is an eight-speed automatic transmission, the present embodiment is not limited thereto.

First, the schematic configuration of an automatic transmission 1 to which the present embodiment can be applied will be described with reference to FIG. 1. The automatic transmission 1 that is preferably used in, e.g., FF vehicles includes a case 6, and an input member (a front cover and a centerpiece) 10 of the automatic transmission 1 which can be connected to a crankshaft of an engine, not shown, is provided on the front side of the case 6. In the automatic transmission 1, a torque converter 2 having a lockup clutch 2a, a speed change mechanism 3, a countershaft portion 4, and a differential portion 5 are placed in the case 6.

The torque converter 2 is placed on an axis about an input shaft (first input shaft) 7A of the speed change mechanism 3 which is coaxial with, e.g., an output shaft of the engine (not shown). The speed change mechanism 3 is placed on an axis about a central shaft (second input shaft) 7B coaxially connected to the input shaft 7A. The countershaft portion 4 is placed on a countershaft 12 that is placed on an axis parallel to the input shaft 7A and the central shaft 7B. The differential portion 5 is placed so as to have right and left axles 15, 15, on an axis parallel to the countershaft 12.

The skeleton diagram of FIG. 1 shows the automatic transmission 1 in a planar developed view, and the input shaft 7A and the central shaft 7B, the countershaft 12, and the right and left axles 15, 15 are located so that a straight line connecting the input shaft 7A and the central shaft 7B with the countershaft 12 forms an angle with a straight line connecting the countershaft 12 and the right and left axles 15, 15 as viewed from the side.

The speed change mechanism 3 includes the input shaft 7A to which rotation from the engine is transmitted via the torque converter 2, and the central shaft 7B placed on the rear side of the input shaft 7A so as to be connected thereto. That is, in the automatic transmission 1, an input shaft 7 in a broad sense is formed by the input shaft 7A and the central shaft 7B. The input shaft 7A has, at its end on the central shaft 7B side, a fitting portion 7b that fits to the outer peripheral surface of an end of the central shaft 7B. The speed change mechanism 3 includes a planetary gear (deceleration planetary gear) DP on the input shaft 7A, and a shifting planetary gear unit (planetary gear unit, second planetary gear) PU on the central shaft 7B.

The planetary gear DP is a so-called double-pinion type planetary gear that has a first sun gear S1, a first carrier (carrier) CR1, and a first ring gear (ring gear) R1, and that has on the first carrier CR1 a pinion P2 meshing with the first sun gear S1 and a pinion P1 meshing with the first ring gear R1 such that the pinions P1, P2 mesh with each other.

The planetary gear unit PU is a so-called Ravigneaux type planetary gear that has as four rotary elements a second sun gear S2, a third sun gear S3, a second carrier CR2, and a second ring gear R2, and that has on the second carrier CR2 a long pinion P3 meshing with the third sun gear S3 and the second ring gear R2 and a short pinion P4 meshing with the second sun gear S2 such that the long pinion P3 meshes with the short pinion P4.

The first sun gear S1 of the planetary gear DP is held stationary with respect to the case 6. The first carrier CR1 is connected to the input shaft 7A, and makes the same rotation (hereinafter referred to as the "input rotation") as that of the input shaft 7A. The first carrier CR1 is also connected to a fourth clutch C-4. Moreover, the first ring gear R1 makes decelerated rotation, which rotation is decelerated from the input rotation, by the first sun gear S1 held stationary and the first carrier CR1 making the input rotation. The first ring gear R1 is connected to a first clutch C-1 and a third clutch C-3.

The third sun gear S3 of the planetary gear unit PU is connected to a first brake B-1 and can be held stationary with respect to the case 6. The third sun gear S3 of the planetary gear unit PU is also connected to the fourth clutch C-4 and the third clutch C-3, so that the third sun gear S3 can receive the input rotation of the first carrier CR1 via the fourth clutch C-4 and can receive the decelerated rotation of the first ring gear R1 via the third clutch C-3. The second sun gear S2 is connected to the first clutch C-1, so that the second sun gear S2 can receive the decelerated rotation of the first ring gear R1. The first clutch C-1 thus can couple and decouple the first ring gear R1 of the planetary gear DP to and from the second sun gear S2 of the planetary gear unit PU.

Moreover, the second carrier CR2 is connected to a second clutch C-2 that receives the rotation of the input shaft 7A via the central shaft 7B, so that the second carrier CR2 can receive the input rotation via the second clutch C-2. The second carrier CR2 is also connected to a one-way clutch F-1 and a second brake B-2, so that rotation of the second carrier CR2 in one direction with respect to the case 6 is restricted via the one-way clutch F-1, and the second carrier CR2 can be held stationary via the second brake B-2. The second ring gear R2 is connected to a counter gear 8 that is supported so as to be rotatable with respect to a center support member fixed to the case 6.

A large diameter gear 11 that is fixed to the countershaft 12 of the countershaft portion 4 meshes with the counter gear 8. A gear 14 of the differential portion 5 meshes with the countershaft 12 via a small diameter gear 12a formed on the outer peripheral surface of the countershaft 12. The gear 14 is fixed to a differential gear 13 and is connected to the right and left axles 15, 15 via the differential gear 13.

Figure 3:
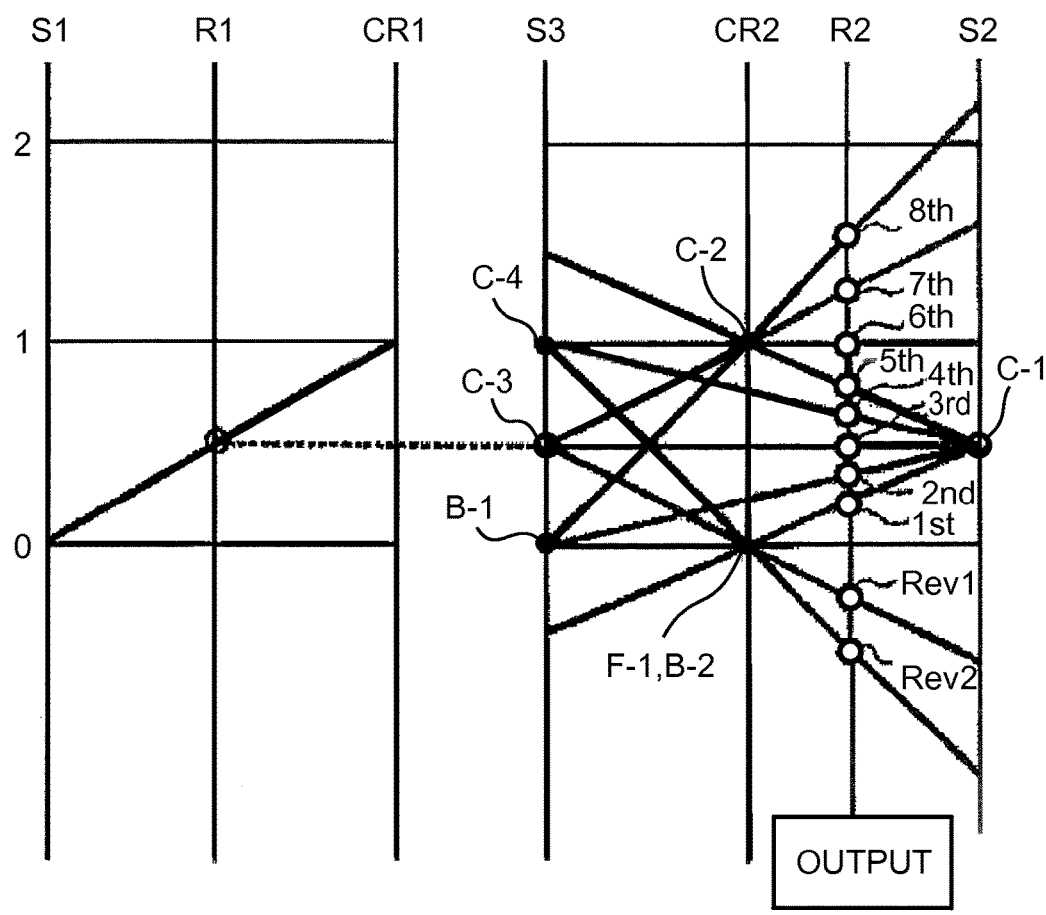
FIG. 3 is a speed diagram of the automatic transmission.

The automatic transmission 1 having the above configuration attains first (1st) to eighth (8th) forward speeds and first (Rev1) and second (Rev2) reverse speeds at the rotational speed ratios shown in the speed diagram of FIG. 3 by engagement and disengagement of the first to fourth clutches C-1 to C-4, the first and second brakes B-1, B-2, and the one-way clutch F-1 in the skeleton diagram of FIG. 1 according to the combinations shown in the engagement table of FIG. 2.

As shown in FIG. 3, at, e.g., the eighth and seventh forward speeds, the rotational speed of the second sun gear S2 is higher than the engine speed. Accordingly, if a hydraulic servo is provided in a clutch drum 22 that operates together with the second sun gear S2 as in conventional examples, the hydraulic servo needs to have a large size for increased rigidity in order to ensure resistance to a centrifugal force that is caused by high speed rotation. It is therefore difficult to make a compact configuration. However, the first ring gear R1 has a rotational speed reduced from the engine speed. Accordingly, providing a hydraulic servo 20 for the first ring gear R1 reduces a centrifugal force that is applied to the hydraulic servo 20 and thus reduces rigidity required for the hydraulic servo 20. Moreover, reducing the thickness of a piston 23 described below can make the hydraulic servo 20 compact.

A part of the automatic transmission 1 in which the planetary gear DP etc. of the present embodiment are placed will be described in detail below with reference to FIG. 4. In the case 6, the planetary gear DP is placed on the input shaft 7A, and the first sun gear S1, the first carrier CR1, and the first ring gear R1 are placed. The first sun gear S1 is integrally fixed to a sleeve member 90 that is fitted to the outer peripheral surface of the input shaft 7A and that extends forward. The sleeve member 90 rotatably supports the input shaft 7A via a needle bearing b2, and is integrally fixed to the inner peripheral surface of a boss portion that is extended rearward from the radially inner side of a pump cover of an oil pump provided in the front part of the case 6. The sleeve member 90 and the boss portion form a boss portion in a broad sense which is extended from the case 6. The first sun gear S1 is therefore held stationary with respect to the case 6.

The first carrier CR1 has a rear carrier plate and a front carrier plate, and rotatably supports the pinions P1, P2. The pinions P1, P2 mesh with each other. The pinion P2 meshes with the sun gear S1, and the pinion P1 meshes with the ring gear R1. The rear carrier plate is fixedly attached to a portion 7a extended radially outward from the outer peripheral surface of the input shaft 7A so as to have a flange shape. The flange-shaped portion 7a of the input shaft 7A is supported by a thrust bearing b3 so as to be rotatable with respect to the first sun gear S1.

The first ring gear R1 has splines R1h on its outer peripheral surface, so that inner friction plates (second friction engagement plate) 21b of the first clutch (hydraulic clutch) C-1, which will be described below, and the third clutch C-3 are spline-engaged with the first ring gear R1. That is, the inner friction plates 21b are fitted to the first ring gear R1 of a clutch hub 91. The first ring gear R1 has on its outer peripheral surface a stopper portion R1a formed on the front end side (the other side in the axial direction) of the first clutch C-1. The stopper portion R1a is a step portion that has an increased diameter and that positions the inner friction plates 21b with respect to the first ring gear R1.

A support member 95 includes a boss portion 95b supported by the input shaft 7A, a circular plate portion 95a extended radially outward from the front end of the boss portion 95b, and an outer cylindrical portion 95g extended rearward from the outer end of the circular plate portion 95a. The first ring gear R1 is supported by the outer end of the circular plate portion 95a of the support member 95, and the circular plate portion 95a is supported by a thrust bearing b1 so as to be rotatable with respect to the flange-shaped portion 7a of the input shaft 7A. The boss portion 95b of the support member 95 is rotatably supported on the input shaft 7A via a bearing (radial bearing) b4. Since the boss portion 95b is supported by the input shaft 7A, backlash of the support member 95 with respect to the input shaft 7A is suppressed.

In the figure, reference characters a1, a2 represent seal rings that seal an oil passage c1. The pair of seal rings a1, a2 are placed between the boss portion 95b and the input shaft 7A, and seal on both sides in the axial direction the oil passage c1 and an oil passage c3 described below in an oil-tight manner. Since the oil passage c3 extending from the inner periphery of the support member 95 and communicating with a hydraulic oil chamber 26 is disposed on the input shaft 7A side with respect to the bearing b4, the hydraulic oil chamber 26 can be placed on the input shaft 7A side. Hydraulic oil can thus be supplied from the oil passage c1 formed in the outer periphery of the input shaft 7A to the hydraulic oil chamber 26 through only one oil passage c3, whereby the number of parts can be reduced and the less time is needed to machine oil passages.

The support member 95 thus rotates together with the first ring gear R1 and rotatably supports the first ring gear R1 on the input shaft 7A. The first ring gear R1 and the support member 95 are integrated to form the clutch hub 91.

Outer friction plates (first friction engagement plate) 21a are alternately arranged between the inner friction plates 21b of the first clutch C-1. The clutch drum 22 includes a drum portion 22a having splines on which the outer peripheries of the outer friction plates 21a are fitted, an annular wall portion 22c extending radially inward from the drum portion 22a, and a boss portion 22b extended rearward from the inner periphery of the annular wall portion 22c. The outer friction plates 21a are spline-engaged with the splines formed on the inner peripheral surface of the drum portion 22a of the clutch drum 22 which is placed on the outer peripheral side. That is, the outer friction plates 21a are fitted in the clutch drum 22.

The boss portion 22b of the clutch drum 22 is supported by a thrust bearing b5 so as to be rotatable with respect to the boss portion 95b of the support member 95. That is, the thrust bearing b5 is placed between the clutch drum 22 and the support member 95 at a position located on the second sun gear S2 side with respect to the fitting portion 7b. The thrust bearing b5 has an inner diameter smaller than the outer diameter of the input shaft 7A. The size of the thrust bearing b5 interposed between the clutch drum 22 and the support member 95 can thus be reduced in the inner radial direction, whereby the size of the automatic transmission 1 can be reduced.

The boss portion 22b of the clutch drum 22 is coupled to the second sun gear (another rotary element) S2 of the planetary gear unit PU so as to rotate together therewith. Since the clutch drum 22 is coupled to the second sun gear S2, the maximum rotational speed of the clutch drum 22 may be the highest of the maximum rotational speeds of the plurality of rotary elements forming the automatic transmission 1. The clutch hub 91, as well as the piston 23 and a cylinder plate 24, which are described below, are placed inside the clutch drum 22 between the planetary gear DP and the planetary gear unit PU.

A clutch drum 30 that couples the first brake B-1 and the third sun gear S3 is provided on the outer peripheral side and rear side of the clutch drum 22. The clutch drum 30 has splines that are spline-engaged with inner friction plates of the first brake B-1.

The hydraulic servo 20 of the first clutch C-1 is placed on the rear side of the planetary gear DP, specifically on the rear side of the circular plate portion 95a of the support member 95. The first clutch C-1 includes friction plates 21 formed by the outer friction plates 21a and the inner friction plates 21b, and the hydraulic servo 20 that brings the friction plates 21 into contact with each other and separates the friction plates 21 from each other. As described above, the friction plates 21 are placed on the outer peripheral side of the ring gear R1, and the hydraulic servo 20 is placed on the inner peripheral side of the friction plates 21.

The hydraulic servo 20 is partially formed by the support member 95, and has the piston 23, the cylinder plate (engagement oil chamber defining member) 24, and a return spring 25, and these components form the hydraulic oil chamber (engagement oil chamber) 26 and a cancel oil chamber 27. The hydraulic oil chamber 26 is an oil chamber to which an engagement oil pressure is supplied, and is defined by the piston 23 and the cylinder plate 24. The cancel oil chamber 27 is an oil chamber that cancels a centrifugal oil pressure generated in the hydraulic oil chamber 26, and is defined by the piston 23 and the support member 95 of the clutch hub 91.

A cylinder portion 95$c$ forming the cancel oil chamber 27 is formed in a portion located at the rear side of the circular plate portion 95$a$, surrounded by the boss portion 95$b$ and the outer cylindrical portion 95$g$ with the circular plate portion 95$a$ interposed therebetween, and facing the piston 23. The piston 23 is axially slidably fitted to the outer periphery of the boss portion 95$b$, and the cylinder plate 24 is fitted to the outer periphery of the boss portion 95$b$ and is immovably positioned by a snap ring 29. That is, the piston 23 is movably supported by the clutch hub 91.

The piston 23 is axially movably placed rearward of the circular plate portion 95$a$ so as to face the circular plate portion 95$a$. The return spring 25 as a leaf spring is disposed in a compressed state between the piston 23 and the circular plate portion 95$a$. The oil-tight cancel oil chamber 27 is formed between the piston 23 and the support member 95 by two seal rings $a3$, $a4$. An oil passage $c2$, which is formed in the circular plate portion 95$a$ to allow hydraulic oil to flow into and out of the cancel oil chamber 27, communicates with the cancel oil chamber 27.

The piston 23 includes a pressure receiving portion 23$b$ that receives an oil pressure, a cylindrical portion 23$c$ that is continuous with the outer periphery of the pressure receiving portion 23$b$, and a pressing portion 23$a$ that is continuous with the cylindrical portion 23$c$ and that can press the outer friction plates 21$a$ and the inner friction plates 21$b$. The pressure receiving portion 23$b$ has an annular shape, has a central hole 23$d$, and is provided so as to face the support member 95. The cylindrical portion 23$c$ is extended rearward from the outer periphery of the pressure receiving portion 23$b$ so as to be separated from the support member 95.

The pressing portion 23$a$ is extended from the rear end of the cylindrical portion 23$c$ toward the outer friction plates 21$a$ and the inner friction plates 21$b$, and can press the outer friction plates 21$a$ and the inner friction plates 21$b$ from the rear side (one side in the axial direction) toward the front side. That is, the piston 23 can press the outer friction plates 21$a$ and the inner friction plates 21$b$ by the pressing portion 23$a$ to cause the outer friction plates 21$a$ to frictionally engage with the inner friction plates 21$b$. The pressing portion 23$a$ has splines 23$s$ formed on its inner peripheral surface so as to be spline-engaged with the splines R1$h$ formed on the outer periphery of the first ring gear R1.

As described above, rearward movement of the cylinder plate 24 is restricted by the snap ring 29 fitted to the boss portion 95$b$. The cylinder plate 24 forms the oil-tight hydraulic oil chamber 26 by two seal rings $a5$, $a6$. The outer periphery of the cylinder plate 24 is sealed in an oil-tight manner from the piston 23 by the seal ring $a6$. The inner periphery of the cylinder plate 24 is sealed in an oil-tight manner from the clutch hub 91 by the seal ring $a5$, and is located closer to the second sun gear S2 than the outer periphery of the cylinder plate 24 is. The overall shape of the cylinder plate 24 is therefore a convex shape having its central portion protruding toward the second sun gear S2. This can improve rigidity of the cylinder plate 24 and reduce the axial thickness thereof as compared to the case where the cylinder plate 24 is in the shape of a flat plate.

The oil passage (hydraulic oil passage) $c3$, which is formed in the boss portion 95$b$ so as to allow hydraulic oil to flow into and out of the hydraulic oil chamber 26, communicates with the hydraulic oil chamber 26. The oil passage $c3$ is formed in the support member 95 at a position located on the input shaft 7A side with respect to the radial bearing $b4$, and extends from the inner periphery of the support member 95 to communicate with the hydraulic oil chamber 26. The cylinder plate 24 is always biased rearward based on the biasing force of the return spring 25 or the oil pressure of the hydraulic oil chamber 26 so as to be held stationary with respect to the support member 95.

When hydraulic oil flows into the hydraulic oil chamber 26 through the oil passage $c3$, the piston 23 slides forward against the return spring 25 and presses the friction plates 21 of the first clutch C-1. At this time, the pressing force of the piston 23 is transmitted from the friction plates 21 to the ring gear R1 via the stopper portion R1$a$. A reaction force that is applied rearward to support the pressing of the piston 23 is transmitted to the support member 95 sequentially via the hydraulic oil in the hydraulic oil chamber 26, the cylinder plate 24, and the snap ring 29. A closed loop of axial stress is formed in the first ring gear R1, the first clutch C-1, and the support member 95, and axial stress is generated between the first ring gear R1 and the support member 95 by the operation of the piston 23.

The first ring gear R1 as a main part of the present embodiment will be described below.

Figure 4:
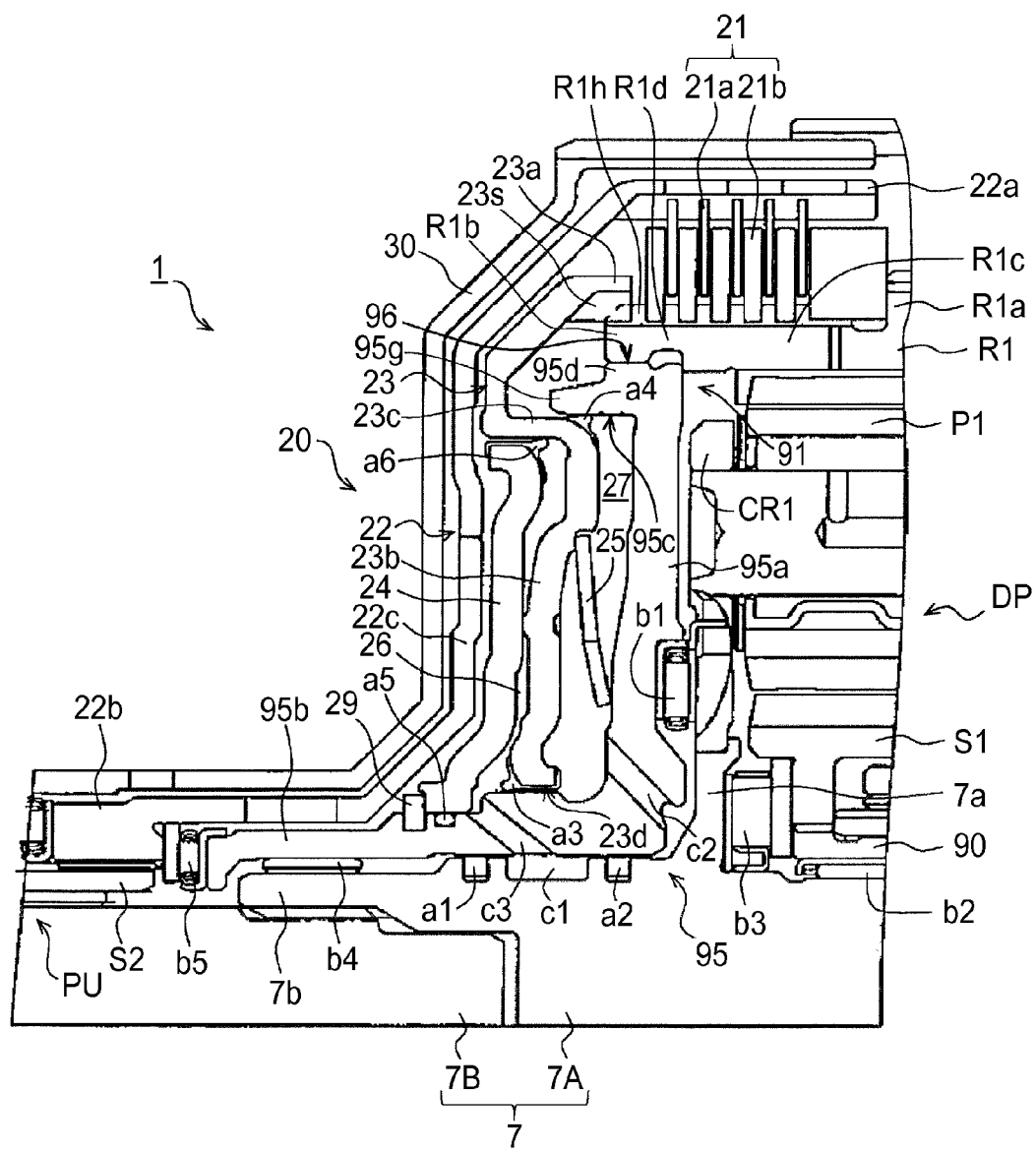
FIG. 4 is an enlarged sectional view showing a part of the automatic transmission according to the embodiment.
Figure 5:
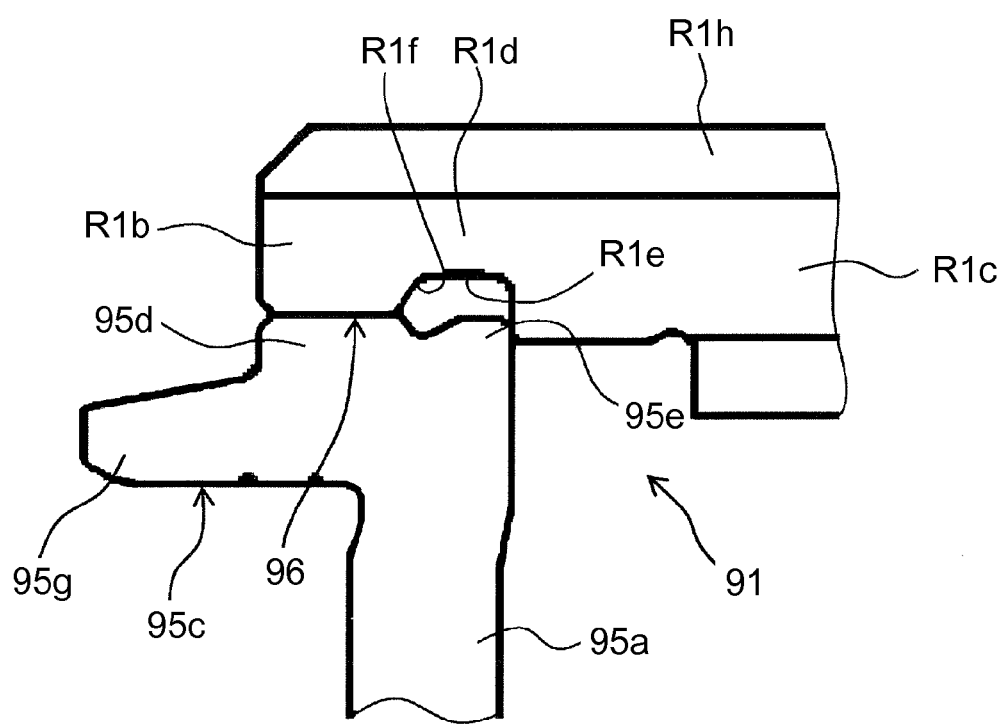
FIG. 5 is an enlarged sectional view showing a main part of the automatic transmission according to the embodiment.

As shown in FIGS. 4 and 5, the first ring gear R1 has a gear-side weld portion R1$b$ at its rear end, and the inner peripheral surface of the gear-side weld portion R1$b$ is welded at a weld surface 96 to the outer peripheral surface of a support-side weld portion 95$d$ provided in the outer periphery of the circular plate portion 95$a$ of the support member 95. A thin portion R1$d$ having a smaller thickness than both a gear portion R1$c$ meshing with the pinion P1 and the gear-side weld portion R1$b$ is formed between the gear-side weld portion R1$b$ and the gear portion R1$c$. The thin portion R1$d$ is thus thinner than the gear portion R1$c$ and the gear-side weld portion R1$b$. Accordingly, when the ring gear R1 is subjected to large radial stress, the thin portion R1$d$ is elastically deformed to a larger extent than the gear portion R1$c$ and the gear-side weld portion R1$b$, whereby the stress to be transmitted to the weld surface 96 is absorbed and reduced.

The inner peripheral surface of the gear-side weld portion R1$b$ is located on the outer peripheral side with respect to the tooth bottom of the gear portion R1$c$. This can prevent interference of a broach with the gear-side weld portion R1$b$ when forming teeth in the gear portion R1$c$ with, e.g., a broaching machine.

The inner peripheral surface of the thin portion R1$d$ has a recess R1$e$ that is recessed with respect to the inner peripheral surface of the gear-side weld portion R1$b$, and the outer peripheral surface of the first ring gear R1 has the splines R1$h$ extending from the rear end of the outer peripheral surface of the first ring gear R1 to a position near the stopper portion R1$a$. A corner R1$f$ of the recess R1$e$ has a continuous curved shape. The outer periphery of the circular plate portion 95a which faces the recess R1e has a contact portion 95e that contacts the rear end face of the gear portion R1c. The recess R1e is a closed space as it is closed by the gear portion R1c and the support member 95. Spatter that is generated when welding the gear-side weld portion R1b and the support-side weld portion 95d can thus be confined in the closed space. The inner peripheral edge of the front end face of the gear-side weld portion R1b and the outer peripheral edge of the front end face of the support-side weld portion 95d are attached so as to form an appropriate angle therebetween in view of ease of molding.

Operation of the first clutch C-1 of the automatic transmission 1 described above will be described below.

When no hydraulic oil is supplied to the hydraulic oil chamber 26, the return spring 25 biases the piston 23 rearward. The pressing portion 23a is thus separated from the friction plates 21, and the first clutch C-1 is in a disengaged state.

When hydraulic oil flows into the hydraulic oil chamber 26 through the oil chamber c3, the piston 23 slides forward against the return spring 25 and presses the friction plates 21 of the first clutch C-1. Since the front ends of the friction plates 21 are stopped by the stopper portion R1a, the force of the inner friction plates 21b and the outer friction plates 21a which press against each other is increased, and the first clutch C-1 is engaged.

In the case where the piston 23 operates to press the friction plates 21, axial stress is generated between the first ring gear R1 and the support member 95 as described above. However, since the first ring gear R1 is bonded to the support member 95 by welding at the weld surface 96, rigidity is sufficiently high. Moreover, since the thin portion R1d is formed between the gear portion R1c and the gear-side weld portion R1b, the stress to be transmitted to the weld surface 96 is absorbed and reduced by elastic deformation of the thin portion R1d.

As described above, according to the automatic transmission 1 of the present embodiment, the piston 23 and the cylinder plate 24 which define the hydraulic oil chamber 26 and the cancel oil chamber 27 can be made to rotate together with the first ring gear R1 that always rotates at a rotational speed lower than that of the first carrier CR1 as an input element of the planetary gear DP. Accordingly, even if rotation that is input to the first carrier CR1 is increased in speed, generation of an excessive centrifugal oil pressure in the hydraulic oil chamber 26 and the cancel oil chamber 27 can be satisfactorily suppressed. Therefore, in the automatic transmission 1, rigidity required for the clutch hub 91, the piston 23, and the cylinder plate 24 of the hydraulic servo 20 which define the hydraulic oil chamber 26 and the cancel oil chamber 27 can further be reduced. These members can thus be reduced in thickness, and the size of the first clutch C-1 and thus the automatic transmission 1 can be reduced especially in the axial direction.

According to the automatic transmission 1 of the present embodiment, the clutch hub 91 is formed by the first ring gear R1 and the support member 95 that rotates together with the first ring gear R1, and the cancel oil chamber 27 is defined by the piston 23 and the support member 95. The piston 23 and the cylinder plate 24 which define the hydraulic oil chamber 26 and the cancel oil chamber 27 can thus be made to rotate together with the first ring gear R1 rotatably supported on the input shaft 7A. Accordingly, even if rotation of the input shaft 7A is increased in speed, generation of an excessive centrifugal oil pressure in the hydraulic oil chamber 26 and the cancel oil chamber 27 can be more satisfactorily suppressed.

According to the automatic transmission 1 of the present embodiment, the clutch hub 91, the piston 23, and the cylinder plate 24 are placed inside the clutch drum 22 between the planetary gear DP and the planetary gear unit PU. Accordingly, the space inside the clutch drum 22 between the planetary gear DP and the planetary gear unit PU can be effectively used, and the axial length of the first clutch C-1 and thus the automatic transmission 1 can further be reduced.

According to the automatic transmission 1 of the present embodiment, the maximum rotational speed of the second sun gear S2 of the planetary gear unit PU is the highest of the maximum rotational speeds of the plurality of rotary elements forming the automatic transmission 1. In this case, the clutch drum 22 is coupled to the rotary element whose rotational speed can be the highest of the plurality of rotary elements forming the automatic transmission 1. Even if the clutch drum 22 together with the second sun gear S2 is rotating at a high rotational speed when the first clutch C-1 is disengaged, the piston 23 and the cylinder plate 24 which define the hydraulic oil chamber 26 and the cancel oil chamber 27 rotate together with the first ring gear R1 that is independent of the rotational speed of the clutch drum 22. Accordingly, generation of an excessive centrifugal oil pressure in the hydraulic oil chamber 26 and the cancel oil chamber 27 can be more satisfactorily suppressed.

According to the automatic transmission 1 of the present embodiment, the first ring gear R1 has the thin portion R1d between the gear portion R1c and the gear-side weld portion R1b. Accordingly, when the first ring gear R1 is subjected to large radial stress, the thin portion R1d is elastically deformed to a larger extent than the gear portion R1c and the gear-side weld portion R1b, whereby the stress to be transmitted to the weld surface 96 is absorbed and reduced. This can suppress concentration of stress of the first ring gear R1 and the support member 95 on the weld surface 96 and thus can improve durability.

According to the automatic transmission 1 of the present embodiment, the thin portion R1d has the recess R1e in its inner peripheral surface. Accordingly, the outer diameter of the thin portion R1d can be made to be the same as that of the gear portion R1c and the gear-side weld portion R1b, and the splines R1h can be formed on the entire outer peripheral surfaces of the gear portion R1c, the thin portion R1d, and the gear-side weld portion R1b. This can improve machinability for forming the splines R1h.

According to the automatic transmission 1 of the present embodiment, since the recess R1e of the thin portion R1d is closed by the gear portion R1c and the support member 95, the recess R1e is a closed space, and spatter that is generated when welding the gear-side weld portion R1b and the support-side weld portion 95d can be confined in the closed space. This can suppress spatter scattering to other parts such as the planetary gear and contaminating lubricating oil, or can suppress spatter adhering to gears.

According to the automatic transmission 1 of the present embodiment, the contact portion 95e contacts the rear end face of the gear portion R1c. This facilitates positioning of the support member 95 in the axial direction when attaching the support member 95 to the first ring gear R1 in assembly work of the automatic transmission 1.

According to the automatic transmission 1 of the present embodiment, the corner R1f of the recess R1e is formed in a continuous curved shape. This can disperse stress and can suppress concentration of stress as compared to the case where the corner R1f is formed by, e.g., crossing of straight lines, such as a right angle.

According to the automatic transmission 1 of the present embodiment, the inner peripheral surface of the gear-side weld portion R1b is located on the outer peripheral side with respect to the tooth bottom of the gear portion R1c. This can prevent interference of a broach with the gear-side weld portion R1b when forming teeth in the gear portion with, e.g., a broaching machine, and can improve machinability for forming the first ring gear R1.

According to the automatic transmission 1 of the present embodiment, the first ring gear R1 decelerates rotation that is input to the planetary gear DP, and outputs the decelerated rotation. Accordingly, rigidity required for the hydraulic servo 20 is reduced as compared to the case where the hydraulic servo 20 is provided for the clutch drum 22 that operates together with the second sun gear S2 of the planetary gear unit PU which rotates at a high speed. The hydraulic servo 20 can therefore be made compact by reducing the thickness of the piston 23. Since a centrifugal load on the hydraulic servo 20 is reduced, durability can be improved.

Figure 6:
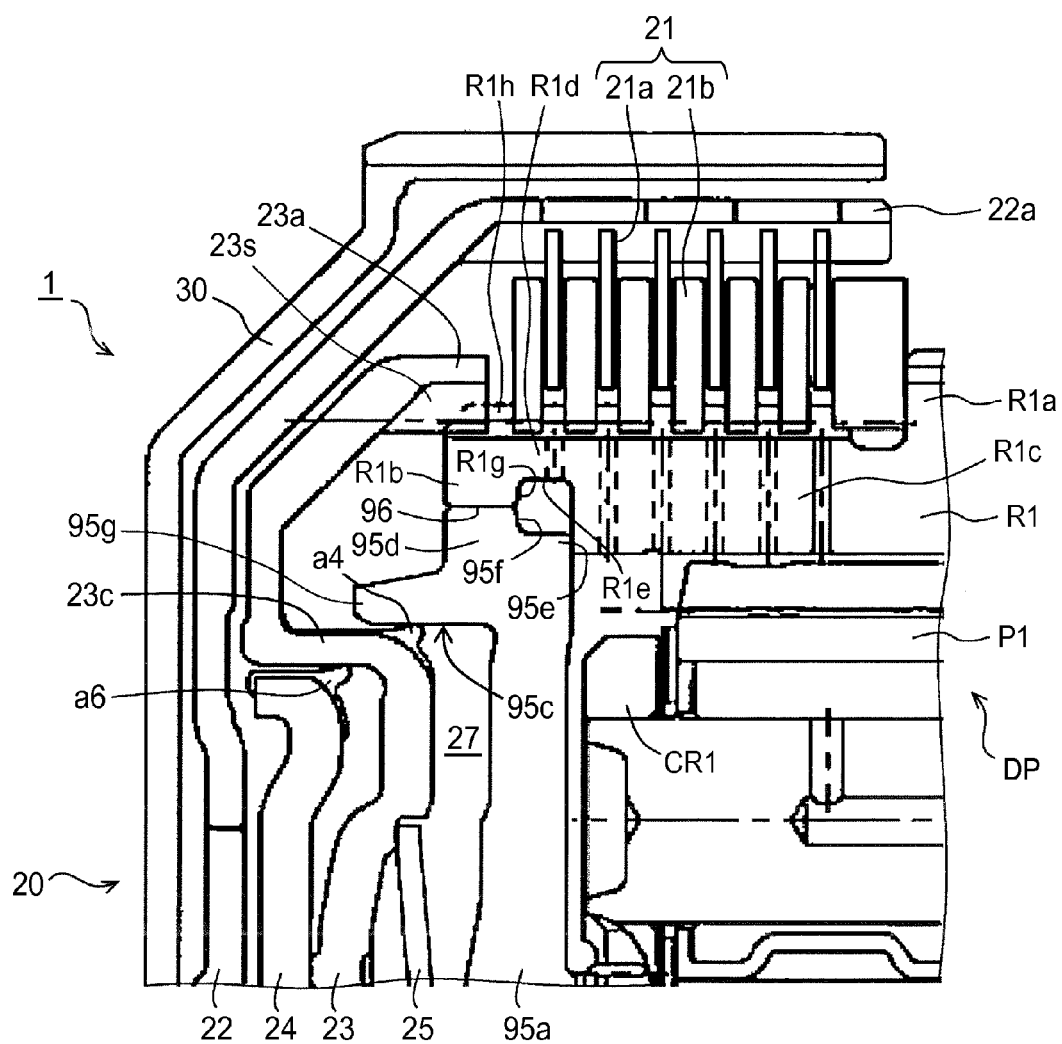
FIG. 6 is an enlarged sectional view showing a modification of the automatic transmission.

The automatic transmission 1 of the present embodiment is described above with respect to the case where the inner peripheral edge of the front end face of the gear-side weld portion R1b and the outer peripheral edge of the front end face of the support-side weld portion 95d are attached so as to form an appropriate angle therebetween. However, the automatic transmission of the present embodiment is not limited thereto. For example, as shown in FIG. 6, an inner peripheral edge R1g of the front end face of the gear-side weld portion R1b and an outer peripheral edge 95f of the front end face of the support-side weld portion 95d may have a surface extending in the radial direction. This can suppress concentration of stress on the weld surface 96 as compared to the case where the inner peripheral edge R1g and the outer peripheral edge 95f form an angle, especially an acute angle.

INDUSTRIAL APPLICABILITY

The automatic transmission according to the present embodiment can be mounted on, e.g., vehicles etc., and is particularly preferable when used as an automatic transmission having a structure in which inner friction plates and outer friction plates of a clutch are provided on the outer peripheral side of a ring gear of a planetary gear.

DESCRIPTION OF THE REFERENCE NUMERALS

1 Automatic Transmission
7 Input Shaft
7A Input Shaft (First Input Shaft)
7B Central Shaft (Second Input Shaft)
7b Fitting Portion
20 Hydraulic Servo
21a Outer Friction Plate (First Friction Engagement Plate)
21b Inner Friction Plate (Second Friction Engagement Plate)
22 Clutch Drum
23 Piston
24 Cylinder Plate (Engagement Oil Chamber Defining Member)
26 Hydraulic Oil Chamber (Engagement Oil Chamber)
27 Cancel Oil Chamber
91 Clutch Hub
95 Support Member
95d Support-Side Weld Portion
95e Contact Portion
95f Outer Peripheral Edge
96 Weld Surface
a1 Seal Ring
a2 Seal Ring
b4 Radial Bearing
b5 Thrust Bearing
C-1 First Clutch (Hydraulic Clutch)
CR1 First Carrier (Carrier)
c3 Oil Passage (Hydraulic Oil Passage)
DP Planetary Gear (Deceleration Planetary Gear)
P1 Pinion
PU Shifting Planetary Gear Unit (Second Planetary Gear)
R1 First Ring Gear (Ring Gear)
R1a Stopper Portion
R1b Gear-Side Weld Portion
R1c Gear Portion
R1d Thin Portion
R1e Recess
R1f Corner
R1g Inner Peripheral Edge
R1h Spline
S2 Second Sun Gear (Another Rotary Element)

The invention claimed is:

1. An automatic transmission, comprising:
a double-pinion type deceleration planetary gear set having a carrier and a ring gear that is configured to decelerate rotation that is input to the carrier and output the decelerated rotation from the ring gear,
a hydraulic clutch that couples and decouples the ring gear of the deceleration planetary gear set to and from another rotary element, and
a second planetary gear set including the another rotary element, wherein
the hydraulic clutch includes:
  a clutch hub that comprises the ring gear of the deceleration planetary gear set,
  a clutch drum that is coupled to the another rotary element,
  a first friction engagement plate that is fitted with an inner periphery of the clutch drum,
  a second friction engagement plate that is fitted with an outer periphery of the ring gear of the deceleration planetary gear set such that the first friction engagement plate and the second friction engagement plate overlap the deceleration planetary gear set in an axial direction as viewed from a radial direction,
  a piston that presses the first and second friction engagement plates to cause the first and second friction engagement plates to frictionally engage with each other, and
  an engagement oil chamber defining member that together with the piston defines an engagement oil chamber to which an engagement oil pressure is supplied,
the piston is movably supported by the clutch hub, and together with the clutch hub defines a cancel oil chamber that cancels a centrifugal oil pressure generated in the engagement oil chamber,
the clutch hub is formed by the ring gear and a support member that rotates together with the ring gear and that rotatably supports the ring gear on an input shaft of the automatic transmission,
the cancel oil chamber is defined by the piston and the support member, and
the clutch hub, the piston, and the engagement oil chamber defining member are placed inside the clutch drum between the deceleration planetary gear set and the second planetary gear set, the clutch hub, the piston and the engagement oil chamber are disposed along the axial direction between a deceleration planetary gear set side and a second planetary gear set side of the of the automatic transmission and the clutch hub is disposed between the deceleration planetary gear set side and the piston.

2. The automatic transmission according to claim 1, wherein the second friction engagement plate is pressed from one side in an axial direction by the piston, the clutch hub includes a stopper portion that stops movement of the second friction engagement plate in the axial direction with respect to the ring gear, and the engagement oil chamber defining member is axially immovably supported by the support member.

3. The automatic transmission according to claim 2, wherein an outer periphery of the engagement oil chamber defining member is sealed in an oil-tight manner from the piston, and an inner periphery of the engagement oil chamber defining member is sealed in an oil-tight manner from the clutch hub, and is located closer to the another rotary element than the outer periphery thereof is.

4. The automatic transmission according to claim 2, wherein the input shaft includes a first input shaft that rotatably supports the support member, and a second input shaft that rotatably supports the another rotary element, the first input shaft has, on a second input shaft side, a fitting portion that fits to an outer peripheral surface of an end of the second input shaft, and a thrust bearing having an inner diameter smaller than an outer diameter of the first input shaft is provided between the clutch drum and the support member at a position located on a side of the fitting portion toward the another rotary element.

5. The automatic transmission according to claim 4, wherein the support member is rotatably supported radially outward of the fitting portion via a radial bearing, and has a hydraulic oil passage formed on a side of the first input shaft with respect to the radial bearing so as to extend from an inner periphery of the support member and to communicate with the engagement oil chamber, and a pair of seal rings provided between the support member and the first input shaft that seal, on both sides in the axial direction, the hydraulic oil passage in an oil-tight manner.

6. The automatic transmission according to claim 1, wherein a maximum rotational speed of the another rotary element is the highest of a plurality of rotary elements forming the automatic transmission.

7. The automatic transmission according to claim 1, wherein the ring gear includes:

a gear portion that meshes with a pinion of the deceleration planetary gear set, a gear-side weld portion that is welded at a weld surface to a support-side weld portion of the support member, and a thin portion that is formed between the gear portion and the gear-side weld portion and that has a smaller thickness than the gear portion and the gear-side weld portion.

8. The automatic transmission according to claim 7, wherein an inner peripheral surface of the gear-side weld portion is welded to an outer peripheral surface of the support-side weld portion, and an inner peripheral surface of the thin portion has a recess that is recessed with respect to the inner peripheral surface of the gear-side weld portion.

9. The automatic transmission according to claim 8, wherein the support member has a contact portion that contacts the gear portion, and the recess is closed by the gear portion and the support member.

10. The automatic transmission according to claim 9, wherein a corner of the recess is formed in a continuous curved shape.

11. The automatic transmission according to claim 7, wherein an inner peripheral surface of the gear-side weld portion is connected to the gear portion of the ring gear and has a diameter larger than a diameter of a tooth root of the ring gear.

12. The automatic transmission according to claim 7, wherein a side surface on a thin portion side of the gear-side weld portion extends in the radial direction and a side surface on a thin portion side of the support-side weld portion extends in the radial direction.

13. The automatic transmission according to claim 1, wherein the engagement oil chamber is disposed between the secondary planetary gear set side and the piston, the piston being disposed between the clutch hub and the engagement oil chamber.

* * * * *